Dec. 2, 1930.  R. H. FLOYD  1,783,359

SLACK TAKE-UP DEVICE

Filed Feb. 14, 1927

Inventor:
Ray H. Floyd
By Arthur F. Durand
Atty

Patented Dec. 2, 1930

1,783,359

UNITED STATES PATENT OFFICE

RAY H. FLOYD, OF CHICAGO, ILLINOIS, ASSIGNOR TO UNIQUE SPARK PLUG CLEANER CO., OF CHICAGO, ILLINOIS, A CORPORATION OF ILLINOIS

SLACK-TAKE-UP DEVICE

Application filed February 14, 1927. Serial No. 168,174.

This invention relates to hydraulic brake adjusters, more particularly to those of the kind shown and described and claimed broadly in prior application No. 110,629, filed May 21, 1926, regarding which latter the present invention is in the nature of an improvement thereon.

Generally stated, the object of the invention is to provide a novel and improved form of controller, for manually controlling the brake adjusting means, preferably by means of a manually operable handle mounted on the dash of the motor vehicle.

More specifically considered, the object of the invention is to provide a hydraulic controller having a rotatable handle which is held against axial movement, but which is operative by its rotary motion to cause a plunger in a stationary cylinder to move back and forth therein, thereby to control the brake adjusting means in the desired manner.

It is also an object to provide certain details and features of construction and combinations tending to increase the general efficiency and the desirability of a brake adjuster controller of this particular character.

To the foregoing and other useful ends, the invention consists in matters hereinafter set forth and claimed and shown in the accompanying drawings in which Fig. 1 is a vertical longitudinal section of the dash and foot-board and adjacent parts of a motor vehicle, showing a hydraulic brake adjuster having a controller constructed in accordance with the principles of the invention.

Figure 1:
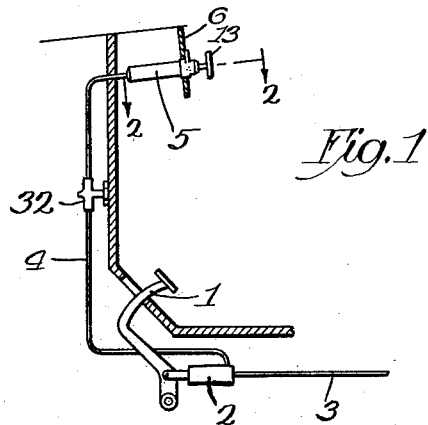

As thus illustrated, the invention comprises a foot pedal 1 connected by a brake adjusting device, or slack takeup device 2, of any suitable character, with the rod 3 which is connected to the brake operating means. The said slack takeup device 2 is connected by a pipe 4 with the end of the stationary cylinder 5, which latter is a part of the controller on the dash 6 of the motor vehicle.

Figure 2:
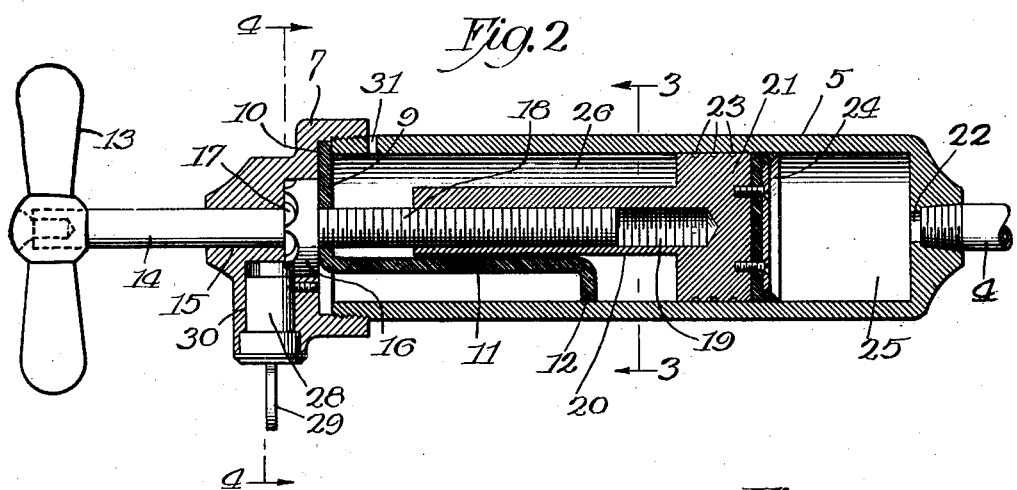
Fig. 2 is an enlarged longitudinal section of said controller on line 2—2 in Fig. 1.
Figure 4:
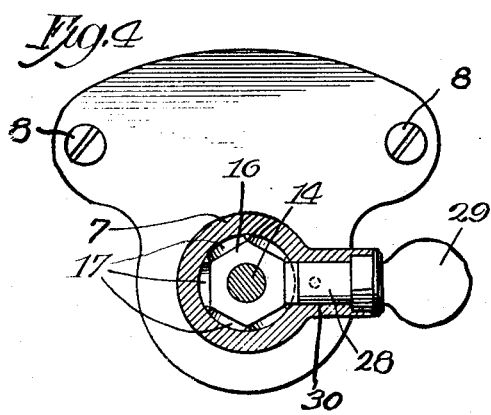
Fig. 4 is a transverse section on line 4—4 in Fig. 2.
Figure 3:
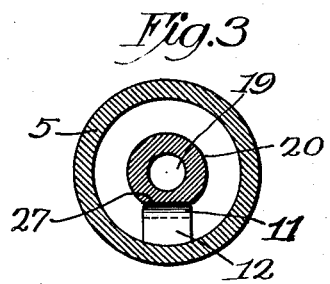
Fig. 3 is a transverse section on line 3—3 in Fig. 2.

The said controller comprises a cap or head 7 into which the said cylinder 5 is screwed, as shown in Fig. 2 of the drawings, which cap or head is secured by screws 8 to the dash of the vehicle. A disc 9 is clamped between the edge of the cylinder 5 and the seat 10 formed in said head or cap, and this disc is provided with an arm 11 which is bent down at its end 12 to bear firmly against the interior of the cylinder. The handle 13 has a stem 14 rotatably mounted in the bearing portion 15 of the said head or cap and this stem is provided with enlargement 16 having notches 17 around one annular edge thereof as shown. Portion 18 of said stem, which is inside the cylinder, is threaded to engage the threaded bore 19 of the hollow stem 20 of the piston or plunger head 21 which is movable back and forth in the cylinder, toward and away from the outlet 22 of the cylinder, which outlet is in communication with the pipe 4 previously mentioned.

Said piston or plunger head 21 is preferably provided with packing rings 23, of any suitable character, and also with a face packing 24, thereby to prevent leakage of the oil or other liquid from the chamber 25 past the plunger or piston head and into the chamber 26, as the latter is merely space for the operating mechanism. When the handle 13 is rotated, the piston or plunger head 21 will be moved one way or the other, depending upon the direction of rotation of the handle. If the piston or plunger head 21 is moved to the right, in Fig. 2, it will force oil or other liquid out of the chamber 25 and into the pipe 4, and from the latter into the slack takeup device or hydraulic brake adjusting means 2, causing in effect a shortening of the connection between rod 3 and the pedal 1, thereby causing a tightening of the brakes of the motor vehicle. This is done, it will be seen, by means of the handle 13 conveniently located on the dash of the vehicle, and held by part 16 against axial movement, so that the handle 13 does not move toward and away from the dash, but occupies a position a fixed distance from said dash. The stem 20, it will be seen, has a flat side 27 which bears upon the opposing flat surface of the arm 11, thereby preventing rotation of the piston or plunger head 21, within the cylinder, so that the only thing that rotates is the handle 13 and its stem.

As a matter of further and special improvement, a lock 28 is provided, of any suitable character, having a key 29 for the operation thereof, in the socket 30 formed in the head or cap 7 previously mentioned, the lock and key being disposed at right angles to the axis of rotation of the handle 13 by which the controller is operated. This lock has a bolt for engagement with the notches 17 whereby the controller can be locked against operation. In this way there is no danger of the brakes being accidently loosened, after being adjusted in the desired manner. Furthermore, this lock feature can be used as an expedient for keeping the car from being used, as by rotating the handle 13 until the brakes are set tightly, and by then locking the controller, the vehicle can be placed in a condition which will prevent its use, except as the brakes might be released by breakage of some part of the vehicle equipment.

But the invention as exemplified by the construction shown and described provides a hydraulic controller which can be made tight to prevent leakage and which will not be liable to get out of order. There are no exposed screw threads on the controller and the only exposed movable parts are the handle 13 and the smooth external portion 14 of the stem of the handle.

A vent 31 can be provided in one side of the cylinder, if desired, to permit escape of the air from the cylinder when the piston or plunger head 21 is moved backward away from the outlet 22, as in loosening the brakes, or in drawing oil or other liquid into the chamber 25 of the cylinder.

For the filling of the hydraulic brake adjusting system thus provided, any suitable provision can be employed. For example, a filler 32 can be provided in the pipe 4, of the kind ordinarily applied to the bearings of a motor vehicle, for engaging an ordinary filling tool by which lubricating oil is injected into the bearings.

Without disclaiming anything, and without prejudice to any novelty disclosed, what I claim as my invention is:

1. In a hydraulic controller, the combination of a cylinder, a cylindrical plunger in said cylinder, a rotary handle, means forming a fixed bearing holding said handle against axial movement, the handle and cylinder being axially aligned, screw threaded adjusting connection between said handle and said plunger, operative to cause back and forth movement of said plunger by the rotation of said handle, and means separate from the cylinder and enclosed therein to hold said plunger against rotation, said bearing and cylinder being rigidly but separably connected, and means to mount the bearing in fixed position to support the cylinder in fixed position.

2. A structure as specified in claim 1, in combination with the brake control of a motor vehicle, and means including a lock to prevent rotation of said handle, to lock the controller against operation, and means whereby said controller is operatively connected with said brake control, whereby the brake control may be locked against operation.

3. In a brake adjuster, the combination of means operative to tighten or loosen the brake, a controller for operating said means, and a lock for locking the controller in any brake tightening or loosening position thereof and against operation and thereby preventing tampering with the brake adjuster, and means for operating the brake while the controller is locked.

4. In a controller, a cylinder, a removable head for said cylinder, a guide plate clamped between said head and the end of the cylinder, a plunger in said cylinder, having means to engage said guide to prevent rotation of the plunger, a rotary handle having a stem extending through said head and provided with a screwthreaded connection with said plunger, whereby rotation of said handle causes axial movement of said plunger, and means between said head and guide to prevent axial displacement of said handle.

Specification signed this 26th day of Jan., 1927.

RAY H. FLOYD.